Figure 1:
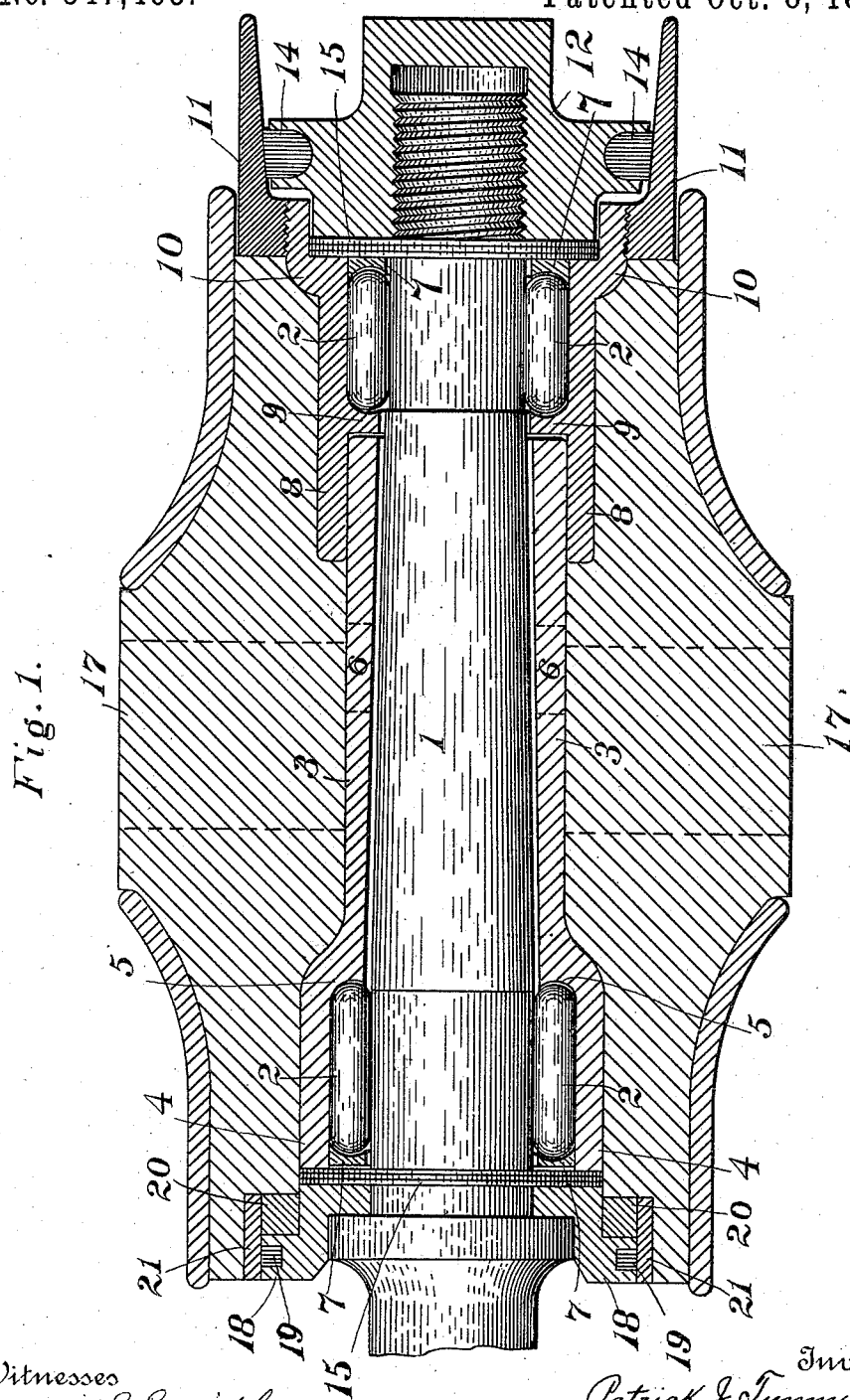

(No Model.)
2 Sheets—Sheet 1.

P. J. TUNNY.
ROLLER BEARING AXLE BOX.

No. 547,465.
Patented Oct. 8, 1895.

Witnesses
James S. Smith.
Frank B. Marlow,

Inventor
Patrick J. Tunny
By Edwin Guthrie
Attorney (No Model.) 2 Sheets—Sheet 2.
P. J. TUNNY.
ROLLER BEARING AXLE BOX.
No. 547,465. Patented Oct. 8, 1895.
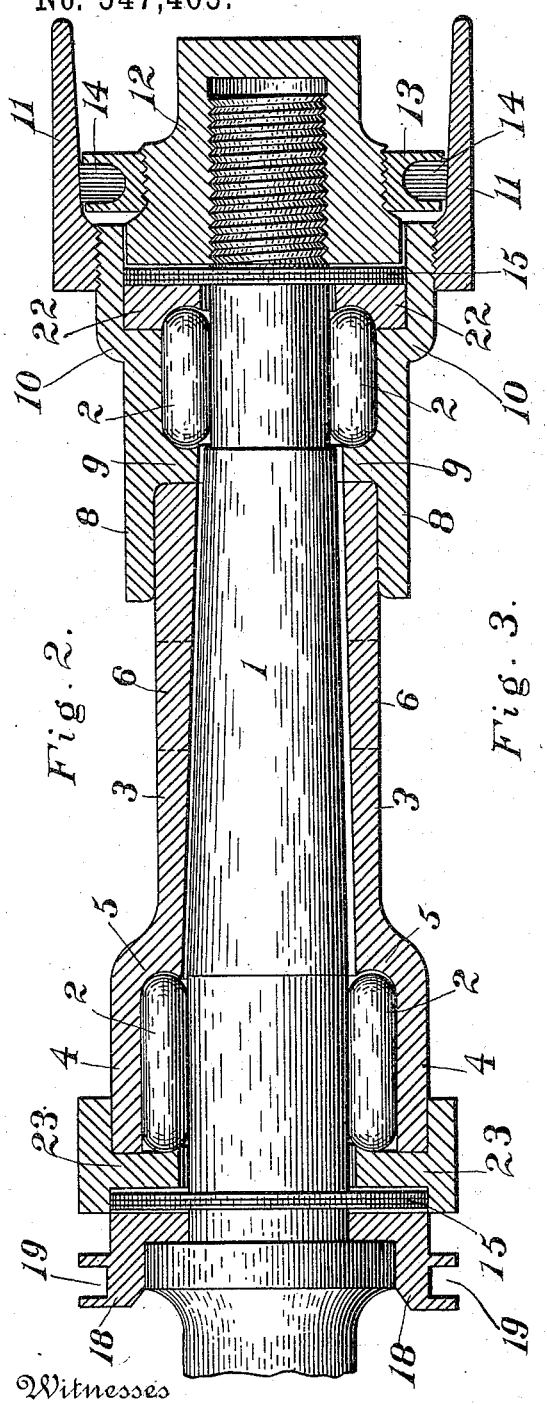
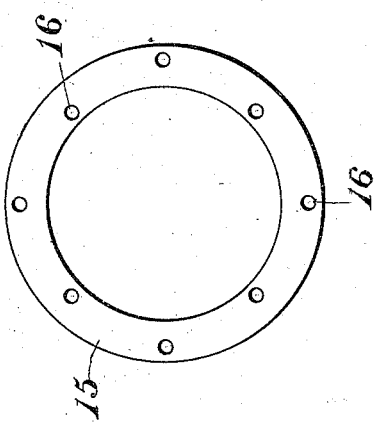
Witnesses
James S. Smith.
Frank B. Marlow,
Inventor
Patrick J. Tunny
By Edwin Guthrie
Attorney

UNITED STATES PATENT OFFICE.

PATRICK J. TUNNY, OF CHICAGO, ILLINOIS.

ROLLER-BEARING AXLE-BOX.

SPECIFICATION forming part of Letters Patent No. 547,465, dated October 8, 1895.

Application filed June 25, 1895. Serial No. 554,025. (No model.)

*To all whom it may concern:*

Be it known that I, PATRICK J. TUNNY, a citizen of the United States, residing at Chicago, in the county of Cook and State of Illinois, have invented certain new and useful Improvements in Roller-Bearing Axle-Boxes; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to hubs for vehicle-wheels; also, and more particularly, to roller-bearing axle-boxes.

It has for its object the prevention of the entrance of dust, abrading particles, or moisture to the lubricated surfaces, and it is designed with the view of affording improved antifriction axle-bearings within which the weight of the load shall be supported upon the lines of rollers instead of the points of balls, thus multiplying the contact-areas with a consequent decrease in the wear of the meeting parts, as well as effecting a distribution of the wear along the spindle.

A further object of my invention is to provide an axle-box of which the principal parts are retained in position obedient to a condition of tension existing between them, no threads being employed in this connection.

The essential features of my invention are the telescoped main and complementary axle-box sleeves of original construction and the specially advantageous manner of assembling the parts, as hereinafter described in detail. Oil-carrying washers are introduced, several of which encircle the spindle at each end, and the end-play of the hub is successfully minimized, while the rattling of the parts in motion is almost entirely obviated.

In the drawings forming part of this description like numbers are used to designate like parts.

Figure 1 represents, principally, a longitudinal sectional view of my invention. Fig. 2 shows a similar sectional view of my axle-box only, dealing with a modification thereof; and Fig. 3 shows the washers provided with orifices for the retention of oil. From Fig. 3 it will be seen that the orifices are placed at different distances from the axis.

In the two views of my device 1 represents the axle of the vehicle. The spindle may be either truly cylindrical or tapering. If of the latter form, cylindrical divisions are turned near the ends of the spindle to accommodate the rollers.

Numeral 2 marks the rollers, of ordinary cylindroid form.

Numeral 3 represents the main axle-box sleeve, which has throughout the greater portion of its length a bore slightly greater than that of the inclosed spindle. Near one end the sleeve 3 expands into a portion 4, of greater interior and exterior diameter, and the added internal space constitutes the channel for the rollers. At the point where the expansion of the sleeve 3 commences the metal is somewhat thickened, and an interior annular groove 5 is fashioned to receive the rounded ends of the rollers. It will be noticed that the curved outline of the section of groove 5 exceeds a quadrant and approximates a semicircle. The reason for this construction will be explained hereinafter. The longer portion of sleeve 3 varies slightly in external diameter, which is least near the expanded portion 4 and longer as the opposite end of the sleeve is approached. A gain in flexibility results from the tapering construction, which is utilized when the parts are pressed into final position.

Numerals 6 6 represent slots through sleeve 3, so placed as to enable them to be reached by a special tool within the axle-box while in the hub, in order that the sleeve may be driven out of the hub when necessary.

Numerals 7 7 represent rings provided with grooves similar in all respects to groove 5 in the sleeve 3 and the complementary sleeve 8, hereinafter described. The rings 7 fit tightly within the expanded portion 4 of the sleeve 3 and limit the end-play of the rollers. The extensions of the groove 5 and the grooves in rib 9 and rings 7, below the axes of the rollers, serve to retain them in position when the wheel is removed from the axle. Figs. 1 and 2 show the relations of the parts, it is thought, sufficiently.

Numeral 8 represents the complementary sleeve of the axle-box. The interior diameter of the main portion of the sleeve is slightly less than the external diameter of the longer division of sleeve 3, and the requirements dictating the relative sizes of the parts mentioned will be set out hereinafter. As ordinarily constructed the sleeve has an expanded or enlarged end section 10, provided with an exterior thread, which engages an interior thread of the dust-band 11, as shown in Fig. 1. Upon the interior of the sleeve 8 is formed a circular rib, and upon that side of the rib toward the enlarged section of the sleeve an annular groove 9, similar in all respects to the groove 5 and to those in rings 7, already described, is provided. The interior diameter of the sleeve 8, between the grooved rib and the enlargement 10, is the internal diameter of the enlargement 4 of the sleeve 3, and one of the rings 7, pressed into the sleeve 8, completes the retaining-pathway for the rollers at that end of the spindle, in the manner previously explained herein.

Numeral 12 represents the axle-nut, which may be constructed with a peripheral groove to contain the packing 14. When so formed, the pressure between the dust-band 11 and the packing 14 is regulated only by moving the axle-nut 12. This mode of regulation being at times inconvenient, it is my practice to thread the exterior of the axle-nut and to screw thereupon a ring 13, grooved to receive the packing. By such means the packing is rendered adjustable, the grooved ring being held in place by its own friction, which will be found generally sufficient, as shown in Fig. 2. I do not confine myself to this method of locking the grooved ring 13, as any equivalent means may be employed.

Numerals 15 15 represent chilled-steel washers, provided with orifices 16 to retain oil for lubrication, as shown by Fig. 3.

17 marks the hub proper, having the bore through which the two sleeves 3 and 8 may be pressed, as already stated.

18 represents a ring or collar of metal, so formed as to fit tightly against and upon the shoulder of the axle, as shown in Fig. 1. This piece remains attached to the axle, and it is provided with a peripheral groove 19, to be occupied by a dustproof circle of packing. An additional ring of packing 20 rests against the inner surface of the flange of collar 18, and, together with the packing 19, bears against a smooth ring 21, firmly fitted into the bore of the hub.

Numerals 22 and 23 in Fig. 2 represent modifications of the rings 7. Ring 22 differs from the rings 7 chiefly in width, and its use calls for a prolongation of the enlargement of the sleeve 8, as shown. In the modified construction the enlargement of the sleeve 3 is shortened and the piece 23 is developed so as to rest against the outer end as well as to inclose a portion of that enlargement. The piece is extended farther and oppositely to provide a circular depression, within which are placed washers 15. The latter extension of the piece 23 also affords a bearing-surface for the side of the packing 20, otherwise in contact with the hub proper.

The assembly of the various parts of my invention within a hub prepared to receive them proceeds as follows: The main sleeve is forced into the bore of the confined hub, usually by an hydraulic press. The complemental sleeve is similarly introduced and compelled to telescope with the first, their joint elasticity serving to fix their positions. The rollers are now inserted and the rings pressed into the sleeves and without binding upon the rollers retain them in place, as described. The axle, upon which the collar 18 has been fixed, bearing the packing-rings 19 and 20 and the washers, can be passed through the hub and the remaining independent parts set up, as indicated in Figs. 1 and 2.

I am aware that sectional dustproof axle-boxes in hubs, together with roller-bearings, have been patented, and I do not claim those features, broadly.

What I do claim, and desire to protect, is—

1. In an anti-friction axle bearing, the combination of a prepared hub with an axle-box consisting of a sleeve having an enlarged portion near one end provided with an interior annular groove, and a sleeve having an interior circular rib provided with an annular groove, said sleeves adapted to be forced one over the other and to maintain their connection by mutual stress, grooved rings attached to said sleeves, suitable rollers movably retained between said rings and said sleeves, the axle spindle, adjustable packing rings and devices for excluding dust and moisture and for keeping the parts in position, substantially as and for the purposes herein shown and described.

2. In an anti-friction axle bearing, the combination with a hub prepared to receive it, of the axle-box consisting of the sleeve, 3, the sleeve, 8, the rollers, 2, the grooved ring, 22, the ring, 23, having, interiorly, the grooved rib, the axle, the collar, 18, attached to the axle, the washers, 15, the adjustable ring, 13, borne by the axle nut, and the packing rings, arranged substantially as and for the purposes shown and described.

In testimony whereof I affix my signature in presence of two witnesses.

PATRICK J. TUNNY.

Witnesses:
YAN URBAN,
E. ROUSEK.